US012738266B2

(12) United States Patent
Tung et al.

(10) Patent No.: US 12,738,266 B2
(45) Date of Patent: Sep. 15, 2026

(54) IMPROVING SPEECH RECOGNITION BY A MACHINE LEARNING MODEL

(71) Applicants: Beijing Zitiao Network Technology Co., Ltd., Beijing (CN); LEMON INC., Grand Cayman (KY)

(72) Inventors: Pham Van Tung, Singapore (SG); YiSheng Lin, Singapore (SG); Han Tao, Singapore (SG); Wei Li, Beijing (CN); Jun Zhang, Beijing (CN); Lu Lu, Los Angeles, CA (US); Yuxuan Wang, Los Angeles, CA (US)

(73) Assignees: Beijing Zitiao Network Technology Co., Ltd., Beijing (CN); Lemon Inc., Grand Cayman (KY)

( * ) Notice: Subject to any disclaimer, the term of this patent is extended or adjusted under 35 U.S.C. 154(b) by 144 days.

(21) Appl. No.: 18/667,928

(22) Filed: May 17, 2024

(65) Prior Publication Data

US 2025/0356843 A1 Nov. 20, 2025

(51) Int. Cl.

| | |
|---|---|
| ***G10L 15/06*** | (2013.01) |
| ***G10L 15/26*** | (2006.01) |
| ***G10L 25/30*** | (2013.01) |

(52) U.S. Cl.

CPC ............ *G10L 15/063* (2013.01); *G10L 15/26* (2013.01); *G10L 25/30* (2013.01)

(58) Field of Classification Search

USPC ........ 704/200, 231, 246, 247, 251, 252, 275

See application file for complete search history.

(56) References Cited

U.S. PATENT DOCUMENTS

| | | | | |
|---|---|---|---|---|
| 2019/0130896 | A1* | 5/2019 | Zhou | G06N 3/044 |
| 2021/0043186 | A1* | 2/2021 | Nagano | G10L 15/063 |
| 2022/0122585 | A1* | 4/2022 | Thomas | G10L 15/16 |
| 2023/0056680 | A1* | 2/2023 | Thomas | G10L 15/065 |
| 2023/0061505 | A1* | 3/2023 | Oh | G10L 15/063 |
| 2024/0331684 | A1* | 10/2024 | Thomas | G10L 15/063 |
| 2025/0252292 | A1* | 8/2025 | Shamir | G06N 3/0455 |

(Continued)

OTHER PUBLICATIONS

Sultonov et al.; "Mixer U-Net: An Improved Automatic Road Extraction from UAV Imagery"; Applied Sciences; vol. 12(4); 1953; 16 pages.

(Continued)

*Primary Examiner* — Leonard Saint-Cyr

(74) *Attorney, Agent, or Firm* — BakerHostetler

(57) ABSTRACT

The present disclosure describes techniques for improving speech recognition using a machine learning model. The machine learning model comprises a speech encoder configured to generate acoustic representations based on input speech, an adapter configured to generate adapted representations based on the acoustic representations, and a decoder configured to generate text corresponding to the input speech. A matching loss is applied during training the machine learning model. The matching loss is configured to explicitly force acoustic representations generated by the adapter to align with text embeddings. The machine learning model is fine-tuned by employing parameter-efficient low-rank adaptation. The machine learning model is trained to perform automatic speech recognition with performance improvement and parameter efficiency.

17 Claims, 14 Drawing Sheets

200

(56) References Cited

U.S. PATENT DOCUMENTS

| | | | | |
|---|---|---|---|---|
| 2025/0279092 | A1* | 9/2025 | Yang | G10L 15/16 |
| 2025/0279093 | A1* | 9/2025 | Rosenberg | G10L 15/063 |

OTHER PUBLICATIONS

Hsu et al.; "HuBERT: Self-Supervised Speech Representation Learning by Masked Prediction of Hidden Units"; IEEE/ACM Transaction on Audio, Speech and Language Processing; arXiv:2106.07447; Jun. 2021; 10 pages.
Zhang et al.; "Google USM: Scaling Automatic Speech Recognition Beyond 100 Languages"; Computation and Language; arXiv:2303.01037; Sep. 2023; 20 pages.
Dosovitskiy et al.; "An Image is Worth 16×16 Words: Transformers for Image Recognition at Scale"; arXiv:2010.11929; Jun. 2021; 22 pages.
Li et al.; "BLIP-2: Bootstrapping Language-Image Pre-training with Frozen Image Encoders and Large Language Models"; 40th Int'l Conf. on Machine Learning; 2023; p. 19730-19742.
Wu et al; "On Decoder-Only Architecture for Speech-to-Text and Large Language Model Integration"; IEEE Automatic Speech Recognition and Understanding Workshop; arXiv:2307.03917; Oct. 2023; 8 pages.
Yu et al.; "Connecting Speech Encoder and Large Language Model for ASR"; ICASSP; arXiv:2309.13963; Sep. 2023; 5 pages.
Wang et al.; "SLM: Bridge the Thin Gap Between Speech and Text Foundation Models"; IEEE Automatic Speech Recognition and Understanding Workshop; arXiv:2310.00230; Sep. 2023; 8 pages.
Fathullah et al.; "Prompting Large Language Models with Speech Recognition Abilities"; ICASSP; arXiv:2307.11795; Jul. 2023; 9 pages.
Zhang et al.; "SpeechGPT: Empowering Large Language Models with Intrinsic Cross-Modal Conversational Abilities"; EMNLP; arXiv:2305.11000; May 2023; 13 pages.
Rubenstein et al.; "AudioPaLM: A Large Language Model That Can Speak and Listen"; Computation and Language; arXiv:2306.12925; Jun. 2023; 27 pages.
Lyu et al.; "Macaw-LLM: Multi-Modal Language Modeling with Image, Audio, Video, and Text Integration"; CVPR; arXiv:2306.09093; Jun. 2023; 18 pages.
Barrault et al.; "SeamlessM4T: Massively Multilingual & Multimodal Machine Translation"; Computation and Language; arXiv:2308.11596; Oct. 2023; 111 pages.
Wang et al.; "VioLA: Unified Codec Language Models for Speech Recognition, Synthesis, and Translation"; Computation and Language; arXiv:2305.16107; May 2023; 11 pages.
Gong et al.; "Listen, Think, and Understand"; ICLR; arXiv:2305.10790; Feb. 2024; 29 pages.
Rebuffi et al.; "Learning multiple visual domains with residual adapters"; 31st Conference on Neural Information Processing Systems; 2017; 11 pages.
Li et al.; "Prefix-Tuning: Optimizing Continuous Prompts for Generation"; Computation and Language; arXiv:2101.00190; Jan. 2021; 15 pages.
Hu et al.; "LoRA: Low-Rank Adaptation of Large Language Models"; arXiv:2106.09685; Jun. 2021; 20 pages.
Baevski et al.; "wav2vec 2.0: A Framework for Self-Supervised Learning of Speech Representations"; 34th Conference on Neural Information Processing Systems; 2020; 12 pages.
Vaswani et al.; "Attention is All you Need"; 31st Conference on Neural Information Processing Systems; 2017; 11 pages.
Panayotov et al.; "LIBRISPEECH: An ASR corpus based on public domain audio books"; ICASSP; 2015; p. 5206-5210.
Wang et al.; "CoVoST 2 and Massively Multilingual Speech-to-Text Translation"; Computation and Language; arXiv:2007.10310; Oct. 2020; 6 pages.
Chen et al.; "GigaSpeech: An Evolving, Multi-domain ASR Corpus with 10,000 Hours of Transcribed Audio"; Sound; arXiv:2106.06909; Jun. 2021; 5 pages.
Chiang et al.; "Vicuna: An Open-Source Chatbot Impressing GPT-4 with 90%* ChatGPT Quality"; https://lmsys.org/blog/2023-03-30-vicuna/; LMSYS; Mar. 2023; accessed May 12, 2025; 11 pages.

* cited by examiner

200

Text 203

CE Loss 230

Decoder 106

K,V

Matching Loss 226

LLM Embedding layer 212

Adapter 104

Depth-wise separable CNN 233

LLM Embedding layer 213

Q

Cross Attention 225

LLM Tokenizer 205

LLM Tokenizer 207

Text Prompt 201

Speech Encoder 102

Text 203

Input Speech 202

400

Configure a machine learning model, wherein the machine learning model comprises a speech encoder configured to generate acoustic representations based on input speech, an adapter configured to generate adapted representations based on the acoustic representations from the speech encoder, and a decoder configured to generate text corresponding to the input speech 402

Apply a matching loss during training the machine learning model, wherein the matching loss is configured to explicitly force acoustic representations generated by the adapter to align with text embeddings 404

Fine-tune the machine learning model by employing parameter-efficient low-rank adaptation (LoRA), wherein the machine learning model is trained to perform automatic speech recognition with performance improvement and parameter efficiency 406

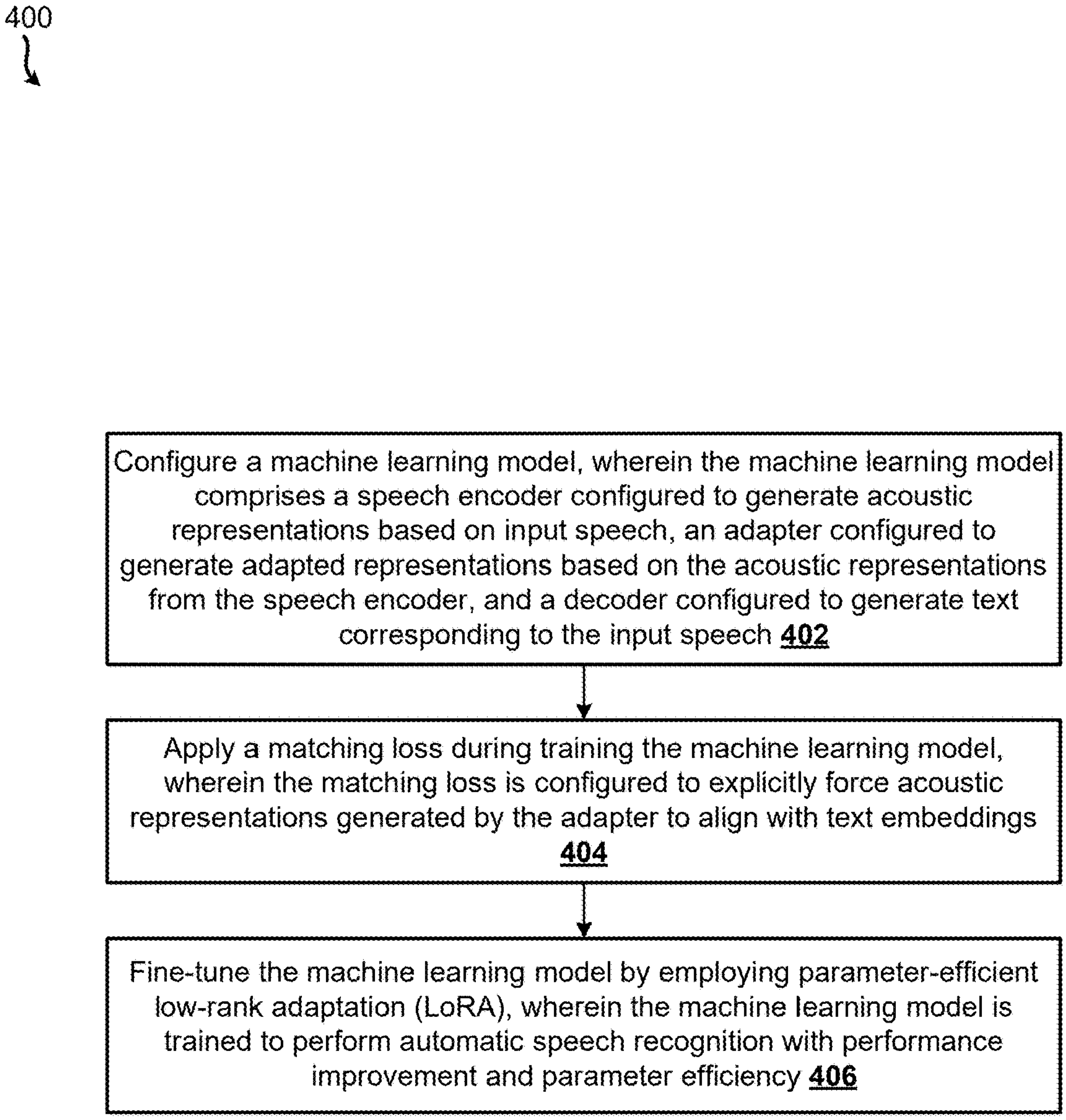

Apply cross attention between acoustic embedding and text embedding 502

Generate a sequence of acoustic representations that has a same length as a text embedding sequence 504

Apply loss functions between the text embedding sequence and the generated sequence of acoustic representations 506

800

| SID | Encoder | Adapter | Decoder | Params |
|---|---|---|---|---|
| S1 | Frozen | Conv1dMLP | Frozen | 48M |
| S2 | Frozen | Conv1dMLP | LoRa | 64M |
| S3 | LoRa | Conv1dMLP | Frozen | 49M |
| S4 | LoRa | Conv1dMLP | LoRa | 65M |
| S5 | Full | Conv1dMLP | Frozen | 345M |
| S6 | Full | Conv1dMLP | LoRa | 361M |
| S7 | Frozen | DwsMLP | Frozen | 20M |
| S8 | Frozen | Conv1dTransformer | Frozen | 320M |
| S9 | LoRa | DwsMLP | LoRa | 85M |
| S10 | LoRa | Conv1dTransformer | LoRa | 385M |

| SID | 960h training data | | | | 100h training data | | | | 10h training data | | | |
|---|---|---|---|---|---|---|---|---|---|---|---|---|
| | dev-clean | dev-other | test-clean | test-other | dev-clean | dev-other | test-clean | test-other | dev-clean | dev-other | test-clean | test-other |
| S1 | 2.38 | 5.99 | 2.29 | 5.67 | 3.55 | 9.35 | 4.23 | 8.69 | 10.05 | 16.92 | 10.69 | 16.16 |
| S2 | 2.01 | 4.71 | 2.02 | 4.31 | 3.42 | 6.34 | 3.45 | 7.19 | 10.62 | 15.67 | 10.42 | 16.22 |
| S3 | 1.87 | 4.61 | Missing | 3.91 | 2.86 | 5.33 | 2.70 | 5.99 | 7.36 | 12.49 | 6.74 | 11.72 |
| S4 | 1.7 | 3.39 | 1.78 | 3.62 | 2.68 | 5.64 | 2.57 | 5.27 | 7.36 | 11.92 | 7.44 | 11.49 |
| S5 | 1.72 | 3.96 | 1.70 | 3.58 | 2.51 | 4.87 | 2.86 | 5.14 | 6.27 | 10.25 | 5.75 | 10.40 |
| S6 | 1.5 | 3.21 | 1.74 | 3.16 | 2.4 | 4.55 | 2.28 | 4.92 | 6.43 | 8.08 | 4.97 | 9.11 |
| S7 | 3.34 | 7.98 | 4.26 | 7.24 | 3.65 | 7.22 | 4.19 | 9.09 | 12.12 | 23.51 | 12.30 | 19.96 |
| S8 | 1.96 | 4.13 | 2.02 | 4.41 | 3.91 | 7.31 | 4.34 | 8.25 | 21.63 | 31.06 | 25.96 | 34.72 |
| S9 | 1.61 | 4.34 | 1.59 | 3.89 | 2.72 | 5.51 | 2.66 | 5.65 | 7.23 | 13.56 | 8.12 | 12.22 |
| S10 | 1.88 | 3.83 | 1.85 | 3.77 | 3.62 | 5.88 | 3.80 | 5.90 | 13.30 | 19.22 | 13.61 | 18.55 |

| SID | 960h training data | | | | 100h training data | | | | 10h training data | | | |
|---|---|---|---|---|---|---|---|---|---|---|---|---|
| | dev-clean | dev-other | test-clean | test-other | dev-clean | dev-other | test-clean | test-other | dev-clean | dev-other | test-clean | test-other |
| S1 | 2.38 | 5.99 | 2.29 | 5.67 | 3.55 | 9.35 | 4.23 | 8.69 | 10.05 | 16.92 | 10.69 | 16.16 |
| T1 | 2.38 | 5.33 | 2.36 | 4.81 | 4.32 | 7.31 | 3.93 | 6.93 | 9.53 | 13.56 | 10.14 | 14.55 |
| S4 | 1.7 | 3.59 | 1.78 | 3.62 | 2.68 | 5.64 | 2.57 | 5.27 | 7.36 | 11.92 | 7.44 | 11.49 |
| T4 | 1.63 | 3.47 | 1.63 | 3.48 | 2.58 | 5.62 | 2.59 | 5.26 | 6.83 | 10.34 | 7.29 | 10.60 |

| Data | 0 | 5 | 10 | 15 |
|---|---|---|---|---|
| 960h | 3.47 (0.33) | 3.46 | 3.44 (0.33) | 3.44 |
| 10h | 10.34 (1.88) | 9.36 | 9.35 (0.89) | 9.46 |

| Data | nrns | 1.0 | 0.5 | 0 | -0.5 |
|---|---|---|---|---|---|
| 960h | 0 | 3.47 | 3.49 | 3.50 | 3.50 |
| | 10 | 3.44 | 3.46 | 3.47 | 3.49 |
| 10h | 0 | 10.34 (1.88) | 9.44 (0.94) | 9.61 | 9.71 |
| | 10 | 9.35 (0.89) | 9.35 (0.89) | 9.51 | 9.61 |

| Data | Constraints | test-clean | test-other | CoVoST2 | GigaSpeech |
|---|---|---|---|---|---|
| 960h | No | 1.63 (0.15) | 3.48 (0.40) | 31.47 (16.94) | 46.42 (33.06) |
| | Yes | 1.63 (0.15) | 3.49 (0.40) | 19.73(5.21) | 27.83(14.52) |
| 10h | No | 7.29 (1.51) | 10.60 (1.83) | 47.89 (24.80) | 59.67 (39.02) |
| | Yes | 6.37 (0.61) | 9.73 (1.00) | 33.09 (10.07) | 44.39 (23.86) |

| Data | Methods | test-clean | Test-other | CoVoST2 | GigaSpeech |
|---|---|---|---|---|---|
| 960h | default | 1.63 (0.15) | 3.49 (0.40) | 19.73(5.21) | 27.83(14.52) |
| | DA | 1.61 (0.15) | 3.37 (0.39) | 18.93 (4.67) | 23.90 (10.81) |
| | NSET | 1.70 | 3.53 | 19.05(3.77) | 16.78 (3.22) |
| | DA+NSET | 1.67 | 3.48 | 18.40 (3.79) | 16.58 (3.33) |
| 10h | default | 6.37 (0.61) | 9.73 (1.00) | 33.09 (10.07) | 44.39 (23.86) |
| | DA | 5.36(0.46) | 8.65 (0.83) | 31.25(9.20) | 40.73 (21.51) |
| | NSET | 7.05 (0.60) | 10.57 (1.06) | 32.84 (8.44) | 26.36 (5.56) |
| | DA+NSET | 5.80 (0.48) | 9.13 (0.94) | 31.40 (8.02) | 26.87 (6.84) |

FIG. 13

IMPROVING SPEECH RECOGNITION BY A MACHINE LEARNING MODEL

BACKGROUND

Machine learning models are increasingly being used across a variety of industries to perform a variety of different tasks. Such tasks may include audio-related tasks. Improved techniques for utilizing machine learning models for audio-related tasks are desirable.

BRIEF DESCRIPTION OF THE DRAWINGS

The following detailed description may be better understood when read in conjunction with the appended drawings. For the purposes of illustration, there are shown in the drawings example embodiments of various aspects of the disclosure; however, the invention is not limited to the specific methods and instrumentalities disclosed.

FIG. 4 shows an example process for improving speech recognition using a machine learning model in accordance with the present disclosure.

FIG. 8 shows example configurations for a machine learning model in accordance with the present disclosure.

FIG. 9 shows an example table illustrating evaluation results in accordance with the present disclosure.

FIG. 10 shows an example table illustrating evaluation results in accordance with the present disclosure.

FIGS. 11A and 11B show example tables illustrating evaluation results in accordance with the present disclosure.

FIG. 12 shows an example table illustrating evaluation results in accordance with the present disclosure.

FIG. 13 shows an example table illustrating evaluation results in accordance with the present disclosure.

DETAILED DESCRIPTION OF ILLUSTRATIVE EMBODIMENTS

Recently, large language models (LLMs) have demonstrated emergent abilities to address various tasks in natural language processing field. Meanwhile, speech foundation models, such as automatic speech recognition model (ASR), also have demonstrated the ability to address various tasks in speech processing and computer vision. Unifying LLMs with speech foundation models from different modalities can enable strong speech and visual understanding.

LLMs can be unified with speech foundation models to perform speech recognition tasks. The architecture of LLM-based ASR generally consists of three components: a speech encoder, an adapter, and a decoder (e.g., an LLM). However, existing techniques for LLM-based ASR are associated with several issues. First, the existing techniques only finetune certain modules with specific configurations, which often excludes many efficient settings. Second, there is no method to explicitly force the representations generated by the adapter to be in a similar space (e.g., aligned) to those of the LLM embeddings. Third, the existing techniques may have very high insertion errors when the model is trained with limited training data or when test sets are mismatched with the training set. As such, improved techniques for speech recognition are desirable.

Figure 1:
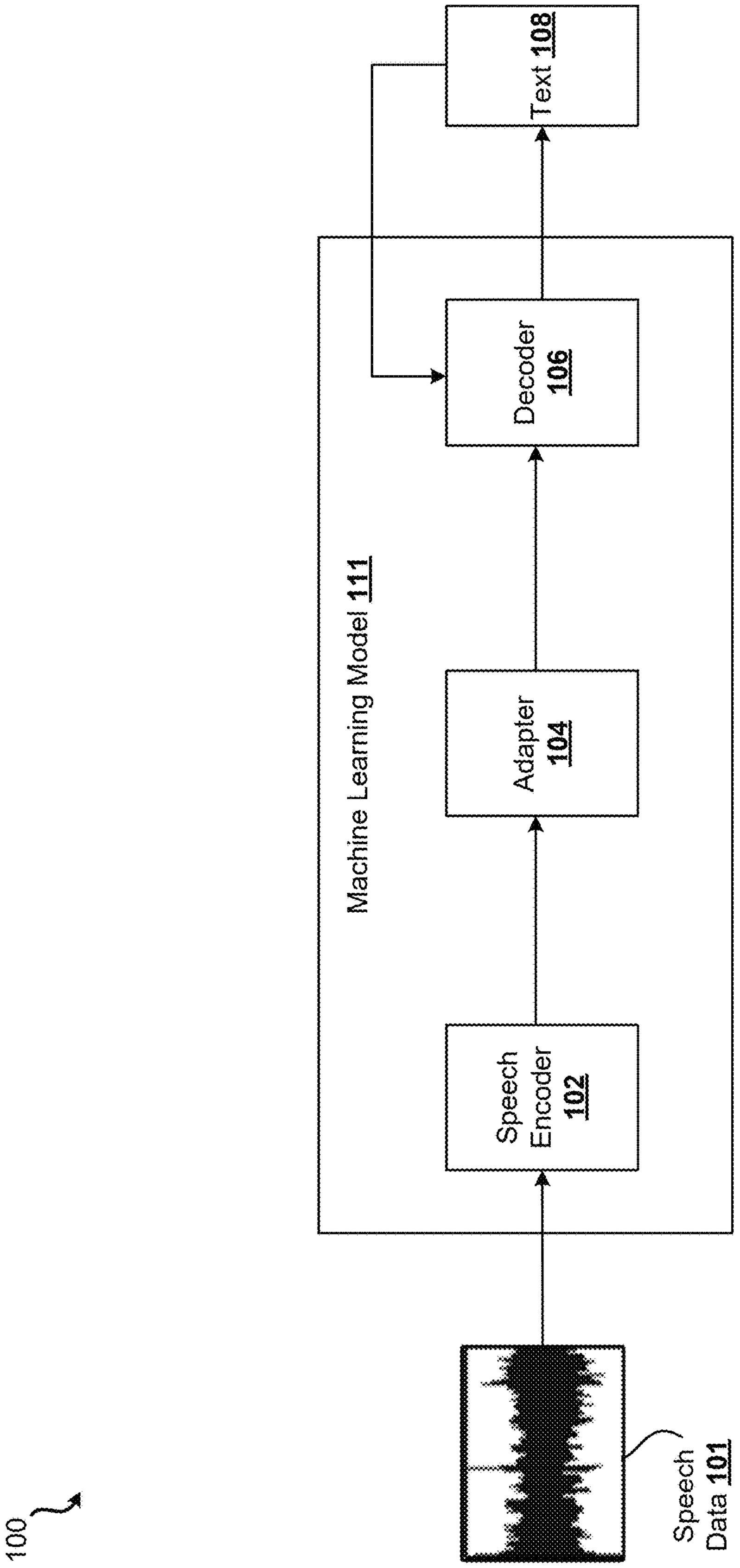
FIG. 1 shows an example system for improving speech recognition in accordance with the present disclosure.

Described herein are improved techniques for speech recognition. Described herein are improved techniques for improving speech recognition. FIG. 1 shows an example system 100 for improving speech recognition. The system 100 can include a machine learning model 111. The machine learning model 111 can include a speech encoder 102, an adapter 104, and a decoder 106. The machine learning model 111 can directly connect and adapt continuous representations generated by the speech encoder 102 to the decoder 106.

The speech encoder 102 can be configured to generate acoustic features based on input speech 101. The input speech 101 can be audio. The audio can be audio of speech. The adapter 104 can receive the acoustic features from the speech encoder 102. The adapter 104 can include, for example, a depth-wise separable convolutional neural network (CNN) to enhance parameter efficiency of the machine learning model 111. The adapter 104 can be configured to generate representations based on the acoustic features generated by the speech encoder 102. The representations generated by the adapter 104 can be received by the decoder 106. The decoder 106 can include, for example, an LLM. The decoder 106 can be configured to generate text 108 corresponding to the input speech. The decoder 106 can be configured to generate the text 108 based on the representations generated by the adapter 104.

The machine learning model 111 can be trained. Training the machine learning model 111 can comprise applying a matching loss. The matching loss can be configured to explicitly force acoustic representations generated by the adapter 104 to align with text embeddings. For example, the matching loss can be configured to explicitly force acoustic representations generated by the adapter 104 to align with text embeddings. Applying the matching loss can include applying cross attention between acoustic embeddings and text embeddings. Applying the matching loss can explicitly force an acoustic representation sequence to have a same length as a text embedding sequence. Applying the matching loss on top of the cross attention to explicitly force alignment of the two modalities can lead to better ASR performance.

In embodiments, training the machine learning model 111 can include fine-tuning the machine learning model. The machine learning model 111 can be fine-tuned using non-speech segments (e.g., a non-speech corpus) with empty transcripts to mitigate insertion errors. Training the machine learning model 111 can include augmenting the training dataset used to train the machine learning model 111. The dataset can be augmented to introduce diverse acoustic conditions. The dataset can be augmented based on speed and volume perturbations.

In embodiments, fine-tuning the machine learning model 111 can comprise fine-tuning both the encoder and decoder (e.g., LLM) with Low-rank Adaptation (LoRa). Due to the immense number of parameters in LLM-based systems, it can be computationally impractical to adapt an entire system to the ASR task. Several approaches have been proposed to address this issue, such as inserting adapter layers or prefix embeddings which are trained on target tasks. While these approaches can be parameter-efficient, they also increase inference costs. Fine-tuning the encoder 102 and the decoder 106 using LoRa can solve these issues, as LoRa uses low-rank matrices which are memory efficient during training and do not impact inference time.

In embodiments, constraints can be implemented during inference to mitigate insertion errors (e.g., to mitigate a high insertion problem). Implementing constraints during inference can include applying n-gram non-repetition constraint. Applying the n-gram non-repetition constraint can ensure that n-gram tokens of a specified length do not repeat during decoding (e.g., by the decoder 106). Implementing constraints during inference can include imposing a penalty on long decoding transcripts, such as during beam search decoding. Imposing a penalty on long decoding transcripts can reduce the insertion errors.

Figure 2:
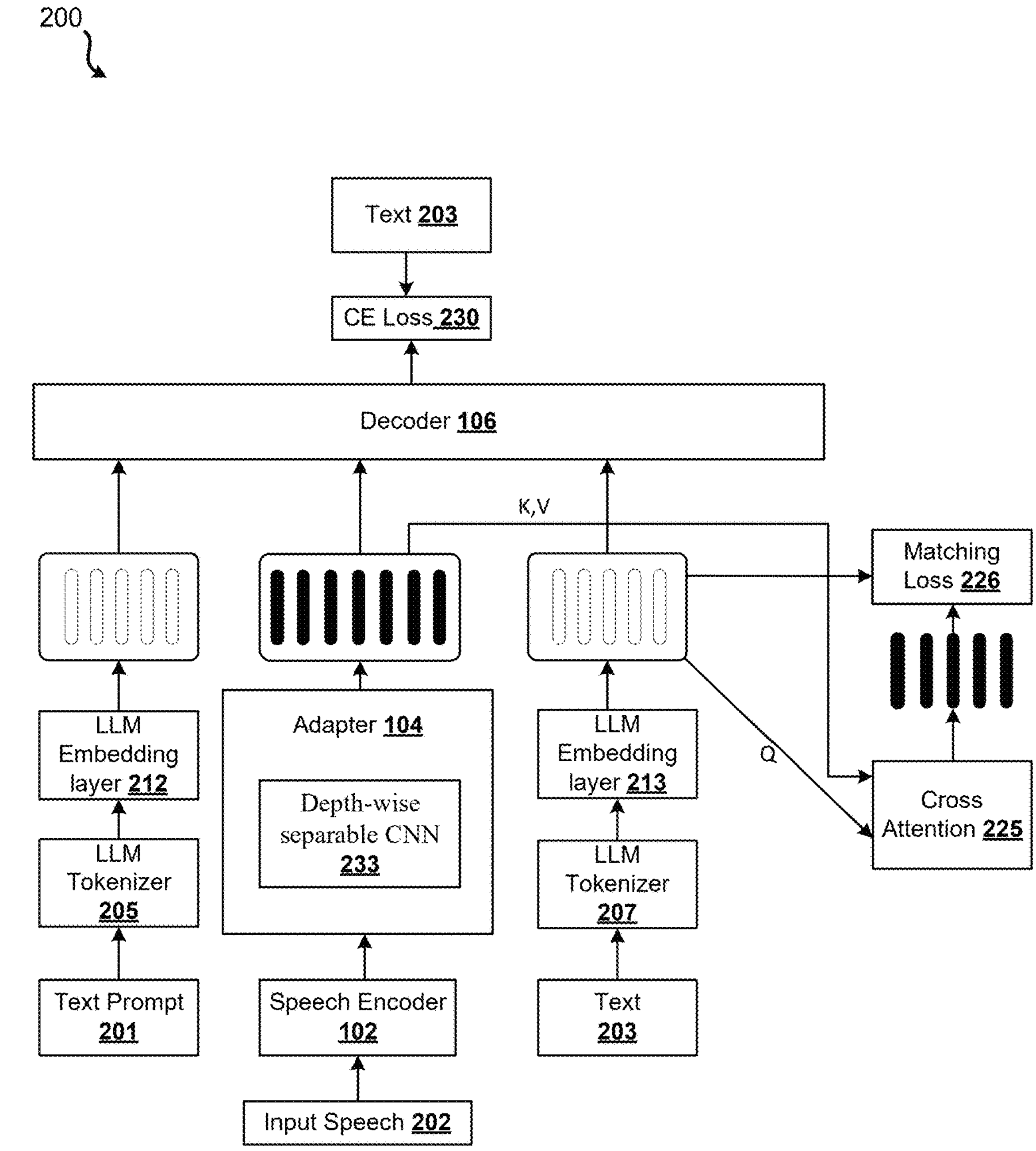
FIG. 2 shows an example diagram for training a machine learning model to improve speech recognition in accordance with the present disclosure.

FIG. 2 shows an example diagram 200 for training a machine learn model to improve speech recognition. Existing techniques for LLM-based ASR only finetune certain modules of the LLM-based ASR models with limited configurations. Further, existing techniques for LLM-based ASR either fully fine-tuned the encoder or keep it frozen, ignoring the option for partial finetuning, which is more practical given the immense number of parameters in many current speech encoders. The machine learning model 111 described herein can be fine-tuned in a variety of different ways.

For example, the speech encoder 102 can be frozen, partially fine-tuned (e.g., with LoRa), or fully fine-tuned. The speech encoder 102 can be fully fine-tuned, for example, on advanced graphics processing units (GPUs), such as the A100, which have high memory capacity. The speech encoder 102 can comprise a HuBert speech encoder or wav2vec2 speech encoder. The decoder 106 can be frozen or partially fine-tuned (e.g., with LoRa). If the decoder 106 has a very large size, it can be difficult or impossible to fully finetune the decoder 106.

The adapter 104 can comprise a fully connected layer adapter. For example, the adapter 104 can comprise a 1D convolution layer for subsampling, followed by a Gaussian Error Linear Unit (GeLu) operation then a linear projection to have the same dimension as the embedding space of the decoder 106. The adapter 104 comprising the 1D convolution layer followed by the GeLu operation then a linear projection is herein referred to as "Conv1dMLP." Alternatively, the adapter 104 can have a different architecture. Each of the architectures that can be utilized by the adapter 104 may require a different number of parameters and may have a different expressive capacity.

For example, the adapter 104 can utilize an architecture denoted as DwsMLP, which replaces a standard 1D convolution with a simple depth-wise separable convolutional neural network (CNN), which requires fewer parameters. The adapter 104 can utilize an architecture denoted as Conv1dTransformer, which uses transformer layers (e.g., a multilayer perceptron) after subsampling (e.g., Conv1d subsampling), which generally have high expressive capacity but require substantially more parameters. The adapter 104 can comprise a depth-wise separable CNN 233 to enhance the parameter efficiency of the machine learning model 111.

A text prompt 201 can be input into a tokenizer, such as the LLM tokenizer 205. The text prompt 201 can be indicative of a task to be performed by the decoder 106. The text prompt 201 can be indicative of a task to be performed by the decoder 106 based on an input speech signal 202. For example, the text prompt 201 can be "Recognize this speech in English." The LLM tokenizer 205 can generate, based on the text prompt 201, a sequence of tokens. The sequence of tokens can be processed by an LLM embedding layer 212 to generate a continuous text embedding.

The speech signal 202 can be input into the speech encoder 102. The speech encoder 102 can generate acoustic representations based on the speech signal 202. The acoustic representations generated by the speech encoder 102 can be input into the adapter 104. The adapter 104 can generate adapted representations of the speech signal 202 based on the acoustic representations. Text 203 (e.g., ground truth text) can be input into a tokenizer, such as the LLM tokenizer 207. The text 203 can be a transcript of the speech in the speech signal 202. The LLM tokenizer 207 can generate, based on the text 203, a sequence of tokens. The sequence of tokens can be processed by an LLM embedding layer 213 to generate text embeddings. The continuous text embedding generated by the LLM embedding layer 212, the adapted representations of the speech signal 202, and the text embeddings generated by the LLM embedding layer 213 can be input into the decoder 106.

The machine learning model 111 can be trained using a combination of a cross-entropy (CE) loss 230 and a matching loss 226. Training the machine learning model 111 using the CE loss 230 can include comparing the output of the decoder 106 and the ground truth text 203. The matching loss 226 can explicitly force acoustic representations generated by the adapter 104 to align with text embeddings. The representations generated by the adapter 104 can be aligned with the LLM embeddings of the text, such as the embeddings generated by the LLM embedding generator 213 based on the ground truth text 203. The ground truth text 203 can be the ground truth text of the speech data 202. The input speech 202 can be audio. Such an alignment can be implicitly achieved by fine-tuning the machine learning model 111 using the matching loss 226.

The matching loss 226 can be used to explicitly align these modalities, which is not a trivial problem as the two sequences have different lengths. Applying the matching loss 226 can include applying cross attention 225, such as dot-product attention, between the text embedding(s) (e.g., LLM embedding generated by the LLM embedding layer 213) and acoustic embedding sequences output from the adapter 104. Applying the cross attention 225, such as dot-product attention, between the text embedding and acoustic embedding sequences can generate a sequence of acoustic representations having the same length as the text embedding sequence. After applying the cross attention 225 between the text embedding and acoustic embedding sequences, loss functions, such as mean square error (MSE) or cosine distance, can be applied between the text embedding and the newly generated acoustic representations.

For example, ⟨X, Y⟩ can represent a training utterance, where X is a sequence of acoustic features and $Y=\{y_1, y_2 \ldots y_{|Y|}\}$ is a sequence of output text. Then, the matching loss 226, denoted as $L_m$, can be described as follows:

$$E_Y = Emb(y_1)Emb(y_2)\ \ldots\ Emb(y_{|Y|}))$$

$$X_1 = \text{Adapt}(Enc(X))$$

-continued $$H = CrossAtt(E_Y, X_1) = softmax\left(\frac{E_Y X_1^T}{\sqrt{d_{llm}}}\right)X_1$$

$$L_m = aMse(E_Y, H) + b\ \mathrm{Cosine}(E_Y, H)$$

where Emb, Enc, and Adapt represent the LLM embedding, encoder, and adapter functions respectively; $d_{llm}$ represents the LLM hidden dimension; and a and b are tunable hyper-parameters.

LLM-based ASR models trained with a small amount of data (e.g., 10h) often produce relatively high insertion errors. For example, such LLM-based ASR models often repeat an n-gram until reaching the output length limit. To alleviate insertion errors associated with the machine learning model 111, one or more constraints can be implemented during inference (e.g., beam search inference). Implementing the one or more constraints can include applying an n-gram non-repetition constraint (NRNS). The NRNS constraint can ensures that n-gram tokens of a specified length, (e.g., 5), do not repeat during decoding by the decoder 106. Implementing the one or more constraints can include applying a length penalty (LP). The LP constraint can impose a greater penalty on long decoding transcripts, thereby reducing insertion errors.

In embodiments, to alleviate insertion errors associated with the machine learning model 111, one or more constraints can be implemented during training of the machine learning model 111. Implementing one or more constraints during training of the machine learning model 111 can reduce a repetition problem that frequently occurs in audio trunks containing only non-speech signals, such as music, noise, or singing.

Implementing the one or more constraints during training can include data augmentation. To enhance the robustness of the machine learning model 111 against variations in acoustic conditions and speaking styles, data augmentation can be performed to introduce diverse acoustic conditions during training. The data augmentation can include volume perturbation and speed perturbation. The volume perturbation and speed perturbation can be applied with certain probabilities.

Random noise or music may not be added to the training utterances, as adding random noise or music to the training utterances can negatively impact performance of the trained model. Implementing the one or more constraints during training can include fine-tuning the pre-trained machine learning model 111 using non-speech segments with empty transcripts (NSET). Ideally, a model should not generate any output for audio trunks containing non-speech signals. By augmenting the ASR training data with a non-speech corpus containing audio segments with empty transcripts, the machine learning model 111 may not generate any output for audio trunks containing non-speech signals. Already trained models may be subsequently fine-tuned for a short duration.

Figure 3:
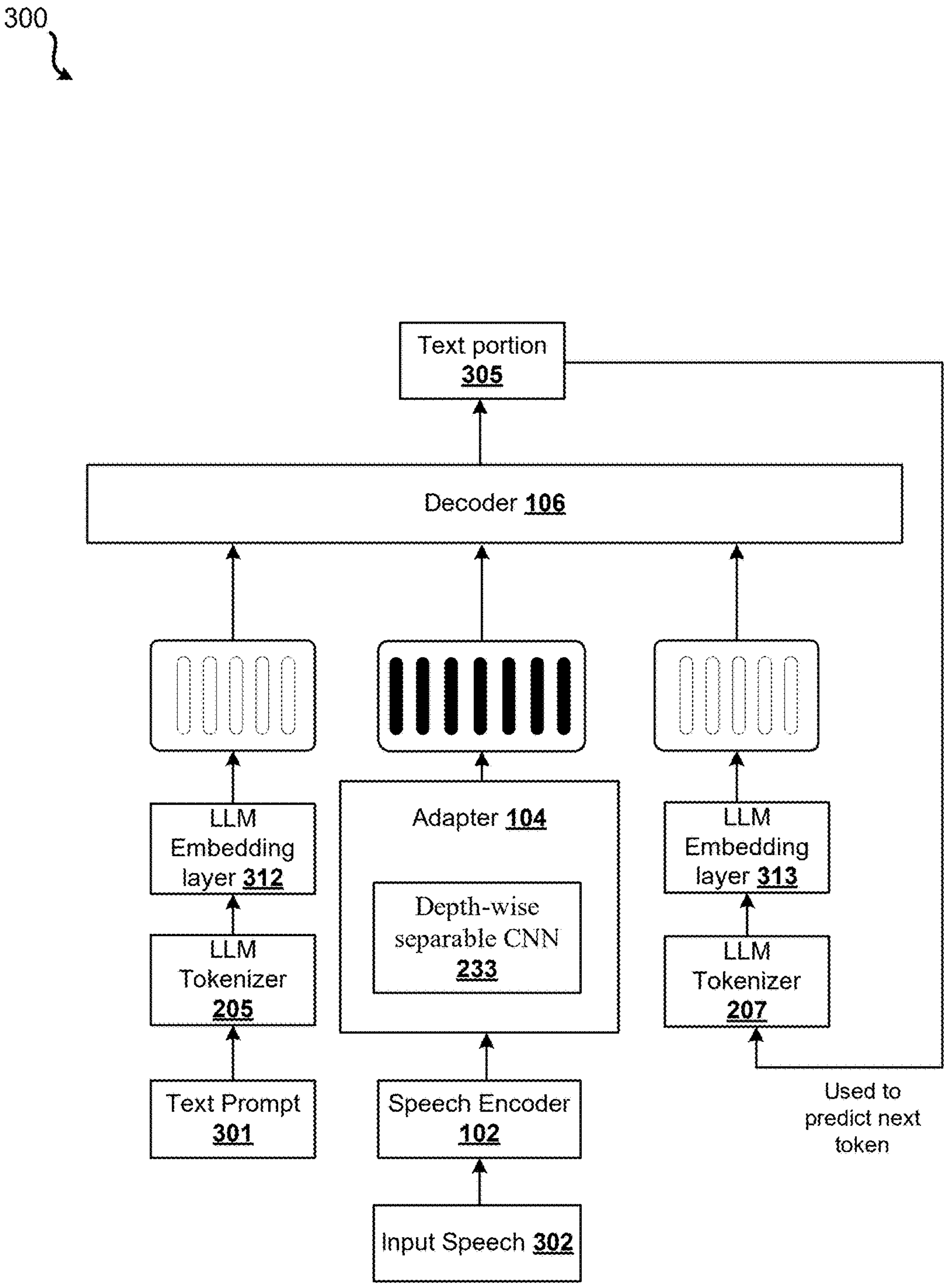
FIG. 3 shows an example diagram for applying a trained machine learning model in accordance with the present disclosure.

FIG. 3 illustrates an example diagram 300 for using the trained machine learning model 111. A text prompt 301 can be input into a tokenizer, such as the LLM tokenizer 205. The text prompt 301 can be indicative of a task to be performed by the decoder 106. The text prompt 201 can be indicative of a task to be performed by the decoder 106 based on an input speech signal 302. For example, the text prompt 201 can be "Recognize this speech (e.g., the speech signal 302) in English." The LLM tokenizer 205 can generate, based on the text prompt 301, a sequence of tokens. The sequence of tokens can be processed by an LLM embedding layer 312 to generate a continuous text embedding. The speech signal 302 can be input into the speech encoder 102. The speech encoder 102 can generate acoustic features based on the speech signal 302. The acoustic features generated by the speech encoder 102 can be input into the adapter 104. The adapter 104 can generate representations of the speech signal 302 based on the acoustic features. The representations generated by the adapter 104 can be input into the decoder 106 to predict corresponding text portions.

The decoder 106 can generate a text portion 305*a* corresponding to a portion of the speech signal 302 based on corresponding representation generated by the adapter 104. The text portion 305*a* may indicate a first word or phrase in the speech signal 302. The text portion 305*a* can be used to predict the next word or phrase in the speech signal 302. For example, the text portion 305*a* can be fed back into the LLM tokenizer 207. The LLM tokenizer 207 can generate, based on the text portion 305*a*, a sequence of tokens. The sequence of tokens can be processed by an LLM embedding layer 313 to generate text embedding. The text embedding generated by the LLM embedding layer 313 can be input into the decoder 106. The decoder 106 can generate a second text portion 305*b* based on the corresponding representation generated by the adapter 104 and the text embedding corresponding to a previously predicted text portion (e.g., text portion 305*a*). The second text portion 305*b* may indicate a second word or phrase in the speech signal 302. The text portions predicted by the decoder 106 can continue to be fed back into the LLM tokenizer 207 to predict the next token until the entire process is complete (e.g., until the entire transcript corresponding to the input speech 302 is generated).

FIG. 4 illustrates an example process 400 for improving speech recognition by a machine learning model. Although depicted as a sequence of operations in FIG. 4, those of ordinary skill in the art will appreciate that various embodiments may add, remove, reorder, or modify the depicted operations.

At 402, a machine learning model can be configured. The machine learning model comprises a speech encoder (e.g., the speech encoder 102). The speech encoder is configured to generate acoustic representations based on input speech. The machine learning model comprises an adapter (e.g., the adapter 104). The adapter is configured to generate adapted representations based on the acoustic representations output from the speech encoder. The machine learning model comprises a decoder (e.g., the decoder 106). The decoder is configured to generate text corresponding to the input speech.

The machine learning model can be trained. Training the machine learning model can comprise applying a matching loss. At 404, a matching loss can be applied. The matching loss can be applied during training the machine learning model. The matching loss can be configured to explicitly force the adapted representations generated by the adapter to align with text embeddings. For example, the matching loss can be configured to explicitly force the adapted representations generated by the adapter to align with embeddings of ground truth text. Training the machine learning model can include fine-tuning the machine learning model.

At 406, the machine learning model can be fine-tuned by employing parameter-efficient low-rank adaptation (LoRA). For example, fine-tuning the machine learning model can comprise fine-tuning both the encoder and the decoder with LoRa. The machine learning model can be trained to perform automatic speech recognition with performance improvement and parameter efficiency.

Figure 5:
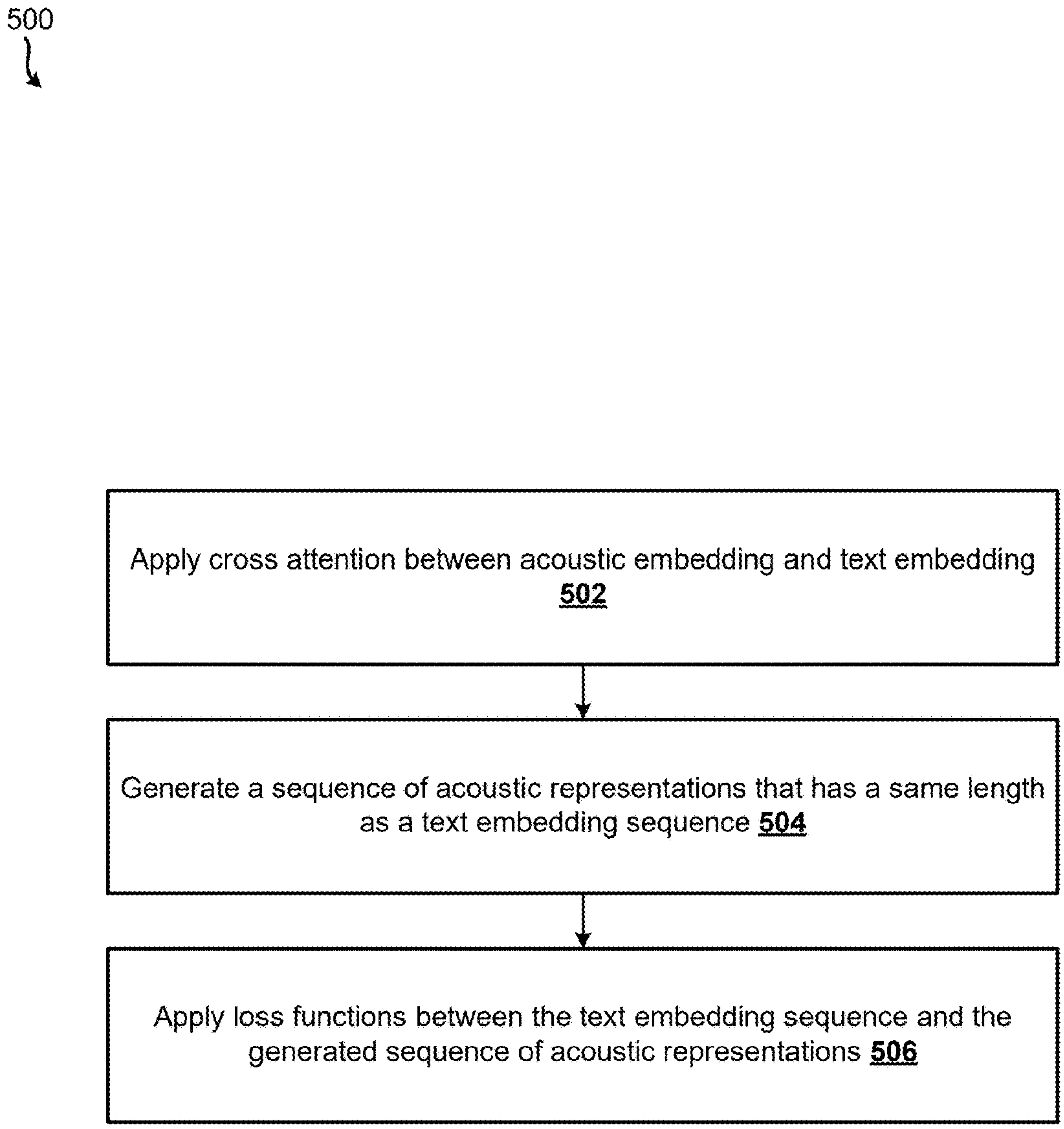
FIG. 5 shows an example process for training a machine learning model to improve speech recognition in accordance with the present disclosure.

FIG. 5 illustrates an example process 500 for training a machine learning model to improve speech recognition. Although depicted as a sequence of operations in FIG. 5, those of ordinary skill in the art will appreciate that various embodiments may add, remove, reorder, or modify the depicted operations.

A machine learning model can be trained. The machine learning model comprises a speech encoder (e.g., the speech encoder 102). The speech encoder is configured to generate acoustic representations based on input speech. The machine learning model comprises an adapter (e.g., the adapter 104). The adapter is configured to generate adapted representations based on the acoustic representations output from the speech encoder. The machine learning model comprises a decoder (e.g., the decoder 106). The decoder is configured to generate text corresponding to the input speech.

Training the machine learning model can comprise applying a matching loss. The matching loss (e.g., matching loss 226) can be configured to explicitly force acoustic representations generated by the adapter to align with ground truth text embeddings (e.g., LLM embeddings generated by the LLM embedding layer 213). For example, the matching loss can be configured to explicitly force acoustic representations generated by the adapter to align with embeddings of ground truth text. Applying the matching loss can include applying cross attention (e.g., cross attention 225) between acoustic embeddings and text embeddings. At 502, cross attention can be applied between acoustic embedding and text embedding.

Applying the matching loss can explicitly force a sequence of acoustic representations generated by the adapter to have a same length as a text embedding sequence. At 504, a sequence of acoustic representations can be generated. The sequence of acoustic representations can be generated by the cross attention mechanism. The sequence of acoustic representations can have a same length as a text embedding sequence. At 506, loss functions can be applied between the text embedding sequence and the generated sequence of acoustic representations. Applying the matching loss on top of the cross attention to explicitly force alignment of the two modalities can lead to better ASR performance.

Figure 6:
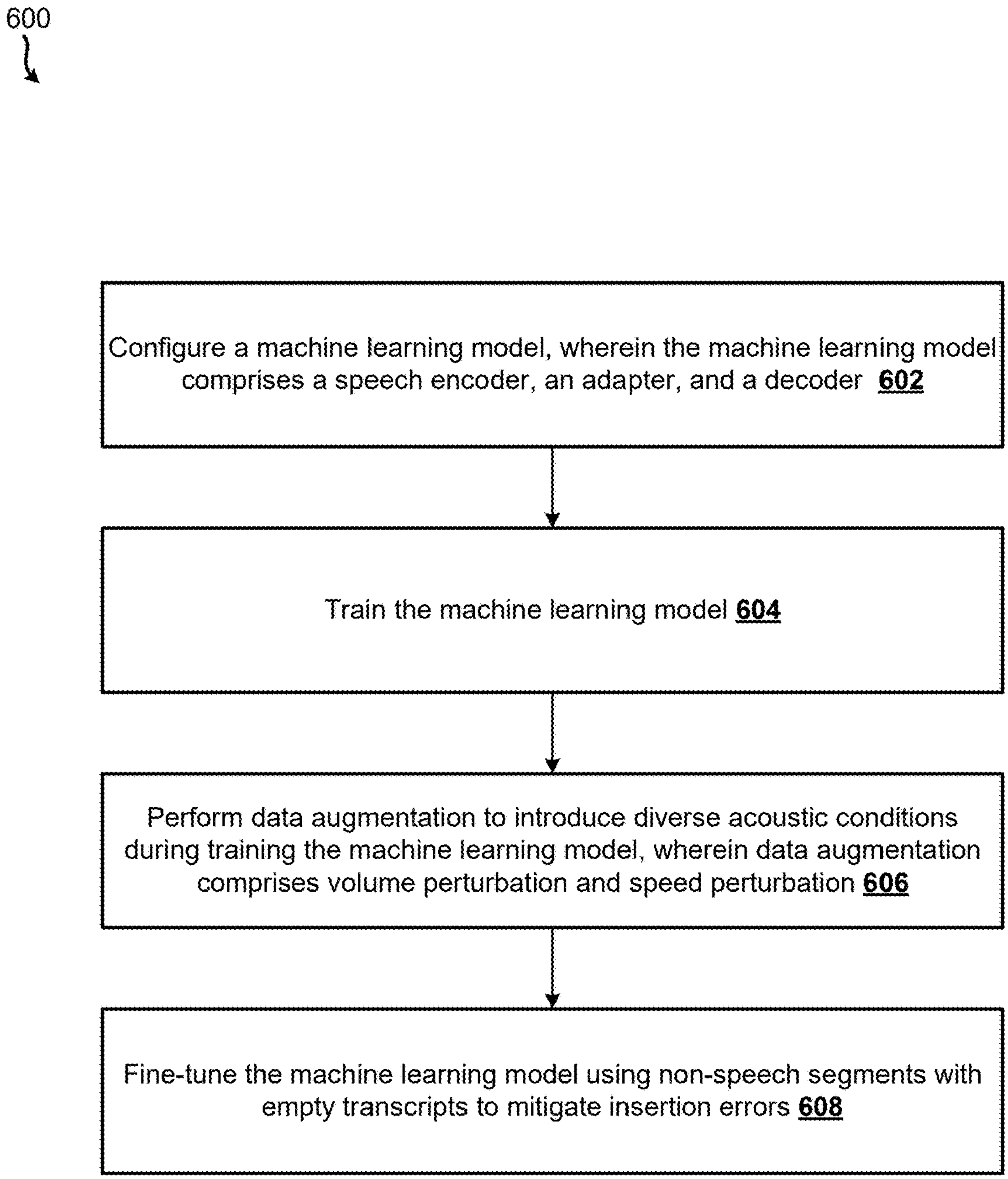
FIG. 6 shows an example process for configuring and training a machine learning model to improve in accordance with the present disclosure.

FIG. 6 illustrates an example process 600 for configuring and training a machine learning model to improve speech recognition. Although depicted as a sequence of operations in FIG. 6, those of ordinary skill in the art will appreciate that various embodiments may add, remove, reorder, or modify the depicted operations.

At 602, a machine learning model can be configured. The machine learning model comprises a speech encoder (e.g., the speech encoder 102). The speech encoder is configured to generate acoustic representations based on input speech. The machine learning model comprises an adapter (e.g., the adapter 104). The adapter is configured to generate adapted representations based on the acoustic representations output from the speech encoder. The machine learning model comprises a decoder (e.g., the decoder 106). The decoder is configured to generate text corresponding to the input speech.

At 604, the machine learning model can be trained. To alleviate insertion errors associated with the machine learning model, one or more constraints can be implemented during training of the machine learning model. Implementing the one or more constraints during training of the machine learning model can reduce repetition problems that frequently occur in audio trunks containing only non-speech signals, such as music, noise, or singing. At 606, data augmentation can be performed. The data augmentation can be performed to introduce diverse acoustic conditions during training the machine learning model. The data augmentation can include volume perturbation and speed perturbation. The volume perturbation and speed perturbation can be applied with certain probabilities.

Random noise or music may not be added to the training utterances, as adding random noise or music to the training utterances can negatively impact performance of the trained model. At 608, the machine learning model can be fine-tuned. The machine learning model can be fine-tuned using non-speech segments with empty transcripts to mitigate insertion errors. Ideally, a model should not generate any output for audio trunks containing non-speech signals. By augmenting the ASR training data with a non-speech corpus containing audio segments with empty transcripts, the machine learning model may not generate any output for audio trunks containing non-speech signals.

Figure 7:
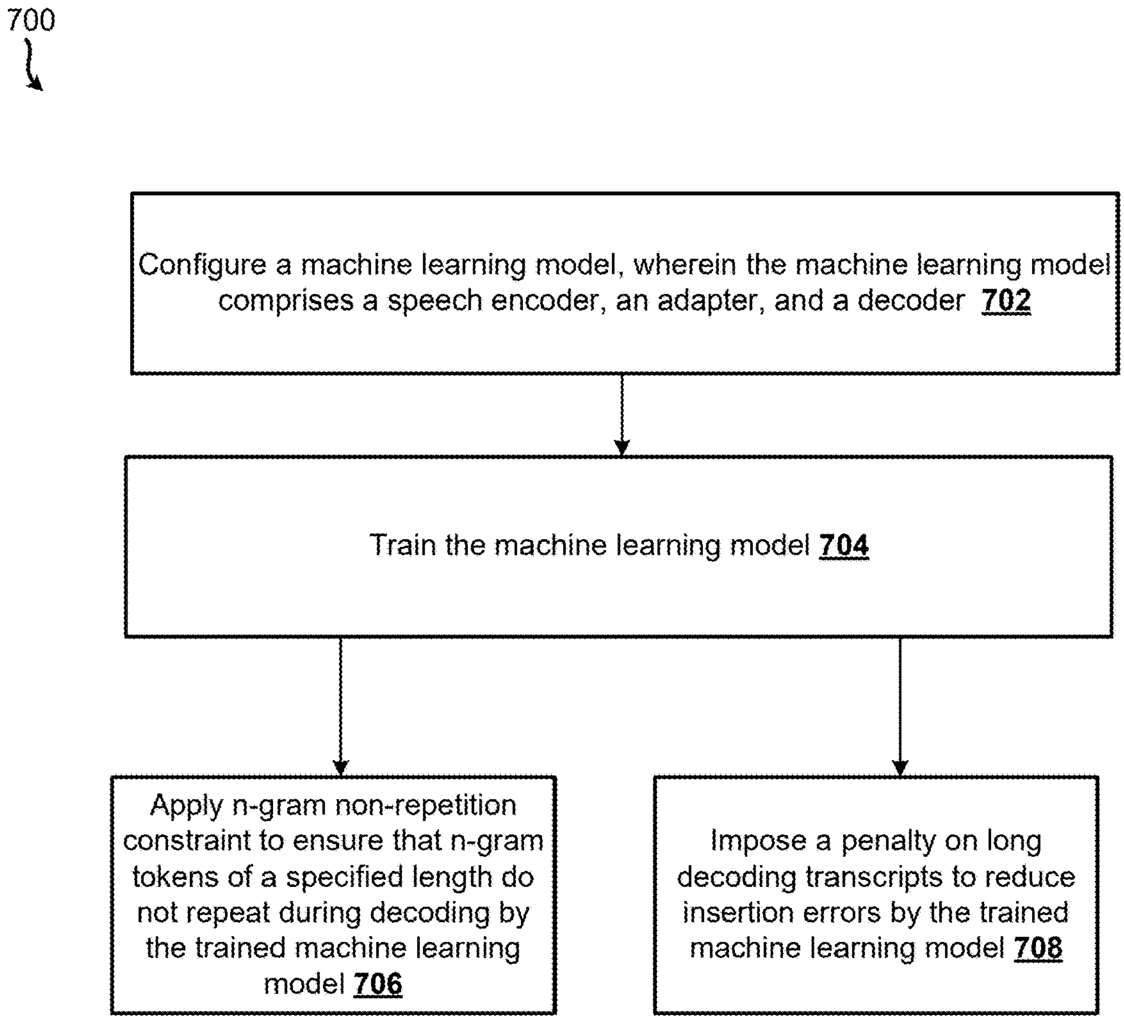
FIG. 7 shows an example process for improving speech recognition in accordance with the present disclosure.

FIG. 7 illustrates an example process 700 for improving speech recognition in accordance with the present disclosure. Although depicted as a sequence of operations in FIG. 7, those of ordinary skill in the art will appreciate that various embodiments may add, remove, reorder, or modify the depicted operations.

At 702, a machine learning model can be configured. The machine learning model comprises a speech encoder (e.g., the speech encoder 102). The speech encoder is configured to generate acoustic representations based on input speech. The machine learning model comprises an adapter (e.g., the adapter 104). The adapter is configured to generate adapted representations based on the acoustic representations from the speech encoder. The machine learning model comprises a decoder (e.g., the decoder 106). The decoder is configured to generate text corresponding to the input speech.

At 704, the machine learning model can be trained. Training the machine learning model can comprise applying a matching loss. The matching loss (e.g., matching loss 226) can be configured to explicitly force acoustic representations generated by the adapter to align with ground truth text embeddings (e.g., LLM embeddings generated by the LLM embedding layer 213). For example, the matching loss can be configured to explicitly force acoustic representations generated by the adapter to align with embeddings of ground truth text. Applying the matching loss can include applying cross attention (e.g., cross attention 225) between acoustic embeddings and text embeddings.

During training the machine learning model, data augmentation can be performed to introduce diverse acoustic conditions. The data augmentation can include volume perturbation and speed perturbation. The volume perturbation and speed perturbation can be applied with certain probabilities. The machine learning model can be fine-tuned. The machine learning model can be fine-tuned using non-speech segments with empty transcripts to mitigate insertion errors.

During inference (e.g., during application of the trained machine learning model) one or more constraints can be implemented to mitigate insertion errors (e.g., to mitigate a high insertion problem). At 706, a n-gram non-repetition constraint can be applied. Applying the n-gram non-repetition constraint can ensure that n-gram tokens of a specified length do not repeat during decoding by the trained machine learning model. At 708, a penalty can be imposed on long decoding transcripts to reduce insertion errors of the trained machine learning model, thereby reducing insertion errors.

The performance of the machine learning model 111 described here was evaluated. Experiments were conducted using the LibriSpeech corpus. In addition to training the machine learning model 111 on the full 960-hour dataset, the machine learning model 111 was trained on two subsets: train-clean 100 h and 10 h. The Word Error Rate (WER) results on the LibriSpeech dev-clean, dev-other, test-clean, and test-other sets were determined. To assess robustness of the machine learning model 111, results on two out-of-domain test sets (CoVoST2 and GigaSpeech) were also determined. For NSET training, the noise and music subsets of the Musan corpus were utilized to construct the non-speech corpus.

The hubert-large-ll60 k model (300M parameters) and the Vicuna vicuna-7b-v1.5 model (7B parameters) from the Hugging Face website were utilized as the speech encoder 102 and the decoder 106, respectively. The speech encoder 102 and the decoder 106 have hidden dimensions of 1024 and 4096, respectively. For the adapter 104, the 1D convolution had input and output channels of 1024 and 4096, respectively, and performs 8 times subsampling. The linear transformations in Conv1dMLP and DwsMLP had input and output dimensions of 4096. Consequently, Conv1dMLP had 48M parameters, while DwsMLP employed depthwise separable convolution, resulting in only 20M parameters. Conv1dTransformer, however, employs 2 layers of Transformer with a hidden dimension of 4096 and FFN dimension 2.5× larger, i.e., 10240. Consequently, Conv1dTransformer has 320M parameters, significantly more than the other two adapter types. For LoRa adaptation of the encoder, {r=8, α=16} was implemented on the query and value matrices of the self-attention module at each layer, resulting in 0.65M parameters. For the decoder 106, {r=16, α=16} was employed across all query, key, and value matrices of the self-attention, yielding 16M parameters.

FIG. 8 shows a table 800 presenting all fine-tuning schemes for the machine learning model 111, each corresponding to a specific configuration of each module. Due to the large number of configurations, the adapter variants were only explored under two conditions: (1) with both encoder and decoder frozen (2) with both encoder and decoder fine-tuned using the LoRa method.

The model were trained on A100 GPUs for 50 k, 20 k, and 10 k steps for 960 h, 100h, and 10h datasets, respectively. Checkpoints were saved at every 1 k steps for the 960 h and 100h data and every 500 steps for the 10 h data. Following training, five consecutive checkpoints with the best averaged validation loss were selected and averaged for evaluation. In initial experiments on the matching loss, the best results were achieved with {a=0.01, b=0.04. For inference, beam search was employed with default settings from Hugging Face, i.e. {beam size=5, max length=256, nrns=0, length penalty=1.0}

The results of different finetuning schemes are shown in the table 900 of FIG. 9. As shown in the table 900, applying LoRa to the decoder 108 (e.g., the LLM) significantly enhances performance across most test sets, particularly on dev/test-other. For instance, S2 surpasses S1 by 21.4%/24.0% (WER reduced from 5.99/5.67 to 4.71/4.31) on dev/test-other and by 15.6%/11.8% (WER reduced from 2.38/2.29 to 2.01/2.02) on dev/test-clean subsets. As shown in the table 800, for the encoder 102, full fine-tuning yields the best outcomes, followed by partial fine-tuning with LoRa across all conditions. However, partial fine-tuning proves to be the most cost-effective. For instance, in setting S4, partial finetuning significantly outperforms the frozen setting S2 (WER reduced from 2.01/4.71 to 1.7/3.59) while only adding 0.65M extra parameters. As shown in the table 800, regarding the architecture of the adapter 104, the Conv1dTransformer clearly outperforms Conv1dMLP when both the encoder 102 and the decoder 108 are frozen but does not exhibit benefit in other conditions. In summary, fine-tuning both the encoder 102 and the decoder 108 with LoRa and using Conv1dMLP as the adapter (S4 setting) achieves the optimal balance between performance and additional parameters.

FIG. 10 shows a table 1000 presenting the results of systems with and without matching loss. S1 and S4 are systems without matching loss taken from the table 900 of FIG. 9, while T1 and T4 are corresponding systems with the matching loss. The matching loss enhances performance across most conditions, with a more pronounced improvement observed in S1 compared to S4. This discrepancy may stem from the LoRa module in both the encoder 102 and decoder 108 components, which already aids in aligning acoustic and text representations, thereby diminishing the benefit from the matching loss. Notably, the improvement on dev/test-other subsets exceeds that of dev/test-clean. This discrepancy can be attributed to the presence of challenging cases in dev/test-other, characterized by higher modality mismatch, which the matching loss mitigates, resulting in improved performance.

The impact of nrns and lb constraints was evaluated on T4 models trained with 960 h (full data) and 10 h (low resource) on dev sets. The results for dev-other are shown in the tables 1100 and 1101 as shown in FIGS. 11A and 11B. The insertion error rate (IER) is also reported for detailed analysis. Each constraint helps reduce IER in the 10 h conditions. For instance, nrns=10 reduces IER from 1.88 to 0.89 on dev-other, resulting in a WER improvement from 10.35% to 9.35%. However, combining these constraints does not yield additional benefits, suggesting that lp and nrns may not be complementary. Overall, the optimal setting is nrns=10, lb=0.

The above constraints were also assessed on test-clean, test-other, and two out-of-domain test sets. The results are summarized in the table 1200 of FIG. 12. As shown in the table 1200, applying constraints reduces IER and consequently enhances performance on in-domain test sets under the 10h training condition. Importantly, applying constraints significantly reduces IER on out-of-domain test sets for both 960 h and 10 h conditions. For instance, for models trained with 960h, IER decreases from 33.06 to 14.52 in GigaSpeech, leading to a WER reduction from 46.42 to 27.83.

The effects of data augmentation and NSET on the machine learning model 111 were evaluated. The results are summarized in the table 1300 of FIG. 13. As shown in the table 1300, data augmentation (DA) significantly improves performance across all conditions, notably in low-resource training and out-of-domain evaluation scenarios. Notably, in scenarios like 960h training and testing on GigaSpeech, the reduction in IER is close to that of WER, indicating that most of the WER benefit stems from reduced insertion errors. Moreover, DA not only reduces insertion errors but also leads to fewer deletion/substitution errors in test-clean and test-other, particularly in the 10h condition. As shown in the table 1300, NSET training reduces insertion errors in out-of-domain test sets. Although the combination of DA and NSET does not always yield the lowest insertion errors, it generally results in better WER due to fewer deletion errors. Overall, the combination of DA and NSET demonstrates increased robustness while effectively suppressing insertion errors.

Figure 14:
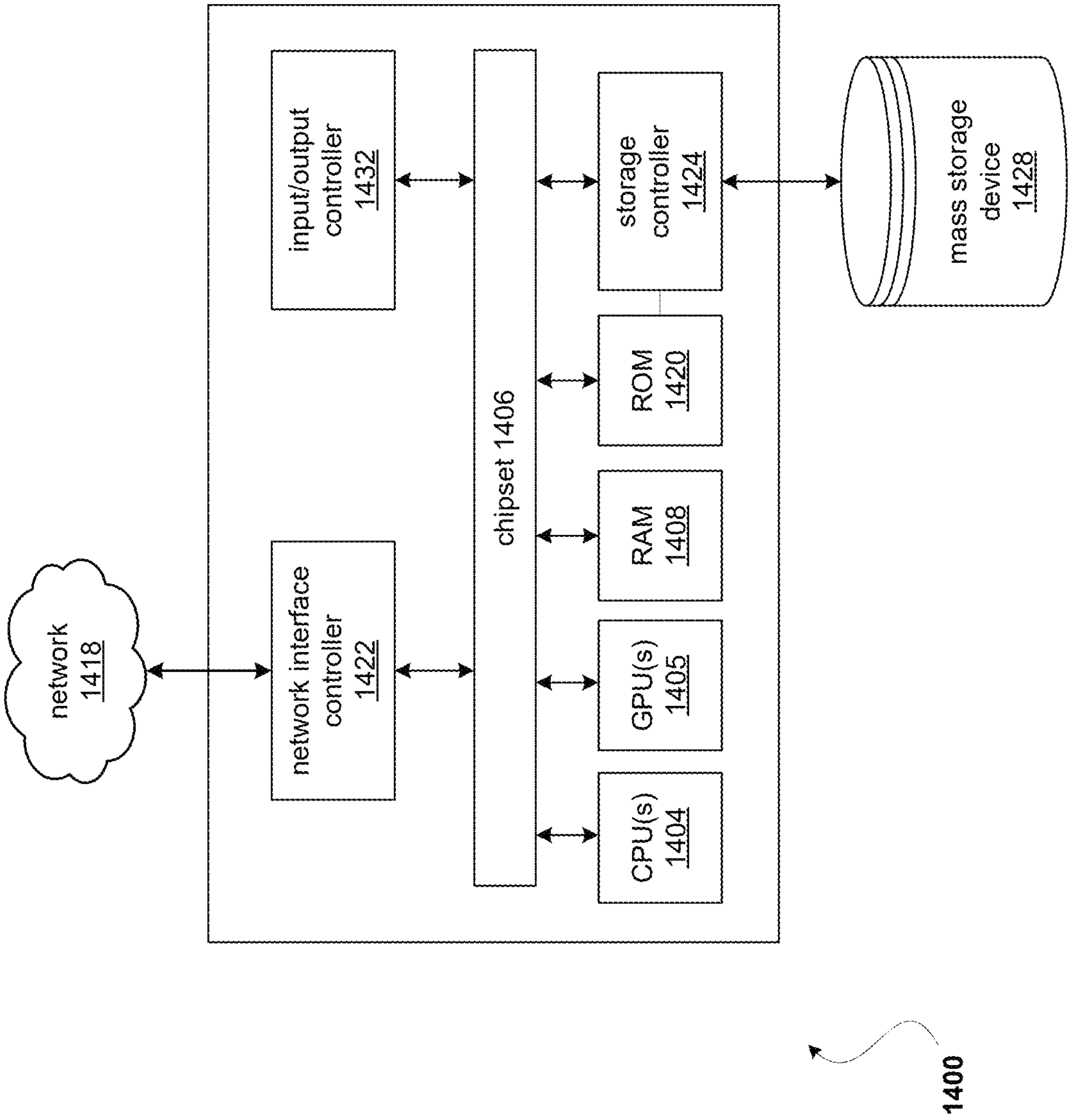
FIG. 14 shows an example computing device which may be used to perform any of the techniques disclosed herein.

FIG. 14 illustrates a computing device that may be used in various aspects, such as the model(s), components, and/or devices depicted in FIGS. 1-3. With regard to FIGS. 1-3, any or all of the components may each be implemented by one or more instance of a computing device 1400 of FIG. 14. The computer architecture shown in FIG. 14 shows a conventional server computer, workstation, desktop computer, laptop, tablet, network appliance, PDA, e-reader, digital cellular phone, or other computing node, and may be utilized to execute any aspects of the computers described herein, such as to implement the methods described herein.

The computing device 1400 may include a baseboard, or "motherboard," which is a printed circuit board to which a multitude of components or devices may be connected by way of a system bus or other electrical communication paths. One or more central processing units (CPUs) 1404 may operate in conjunction with a chipset 1406. The CPU(s) 1404 may be standard programmable processors that perform arithmetic and logical operations necessary for the operation of the computing device 1400.

The CPU(s) 1404 may perform the necessary operations by transitioning from one discrete physical state to the next through the manipulation of switching elements that differentiate between and change these states. Switching elements may generally include electronic circuits that maintain one of two binary states, such as flip-flops, and electronic circuits that provide an output state based on the logical combination of the states of one or more other switching elements, such as logic gates. These basic switching elements may be combined to create more complex logic circuits including registers, adders-subtractors, arithmetic logic units, floating-point units, and the like.

The CPU(s) 1404 may be augmented with or replaced by other processing units, such as GPU(s) 1405. The GPU(s) 1405 may comprise processing units specialized for but not necessarily limited to highly parallel computations, such as graphics and other visualization-related processing.

A chipset 1406 may provide an interface between the CPU(s) 1404 and the remainder of the components and devices on the baseboard. The chipset 1406 may provide an interface to a random-access memory (RAM) 1408 used as the main memory in the computing device 1400. The chipset 1406 may further provide an interface to a computer-readable storage medium, such as a read-only memory (ROM) 1420 or non-volatile RAM (NVRAM) (not shown), for storing basic routines that may help to start up the computing device 1400 and to transfer information between the various components and devices. ROM 1420 or NVRAM may also store other software components necessary for the operation of the computing device 1400 in accordance with the aspects described herein.

The computing device 1400 may operate in a networked environment using logical connections to remote computing nodes and computer systems through local area network (LAN). The chipset 1406 may include functionality for providing network connectivity through a network interface controller (NIC) 1422, such as a gigabit Ethernet adapter. A NIC 1422 may be capable of connecting the computing device 1400 to other computing nodes over a network 1416. It should be appreciated that multiple NICs 1422 may be present in the computing device 1400, connecting the computing device to other types of networks and remote computer systems.

The computing device 1400 may be connected to a mass storage device 1428 that provides non-volatile storage for the computer. The mass storage device 1428 may store system programs, application programs, other program modules, and data, which have been described in greater detail herein. The mass storage device 1428 may be connected to the computing device 1400 through a storage controller 1424 connected to the chipset 1406. The mass storage device 1428 may consist of one or more physical storage units. The mass storage device 1428 may comprise a management component 1410. A storage controller 1424 may interface with the physical storage units through a serial attached SCSI (SAS) interface, a serial advanced technology attachment (SATA) interface, a fiber channel (FC) interface, or other type of interface for physically connecting and transferring data between computers and physical storage units.

The computing device 1400 may store data on the mass storage device 1428 by transforming the physical state of the physical storage units to reflect the information being stored. The specific transformation of a physical state may depend on various factors and on different implementations of this description. Examples of such factors may include, but are not limited to, the technology used to implement the physical storage units and whether the mass storage device 1428 is characterized as primary or secondary storage and the like.

For example, the computing device 1400 may store information to the mass storage device 1428 by issuing instructions through a storage controller 1424 to alter the magnetic characteristics of a particular location within a magnetic disk drive unit, the reflective or refractive characteristics of a particular location in an optical storage unit, or the electrical characteristics of a particular capacitor, transistor, or other discrete component in a solid-state storage unit. Other transformations of physical media are possible without departing from the scope and spirit of the present description, with the foregoing examples provided only to facilitate this description. The computing device 1400 may further read information from the mass storage device 1428 by detecting the physical states or characteristics of one or more particular locations within the physical storage units.

In addition to the mass storage device 1428 described above, the computing device 1400 may have access to other computer-readable storage media to store and retrieve information, such as program modules, data structures, or other data. It should be appreciated by those skilled in the art that computer-readable storage media may be any available media that provides for the storage of non-transitory data and that may be accessed by the computing device 1400.

By way of example and not limitation, computer-readable storage media may include volatile and non-volatile, transitory computer-readable storage media and non-transitory computer-readable storage media, and removable and non-removable media implemented in any method or technology. Computer-readable storage media includes, but is not limited to, RAM, ROM, erasable programmable ROM ("EPROM"), electrically erasable programmable ROM ("EEPROM"), flash memory or other solid-state memory technology, compact disc ROM ("CD-ROM"), digital versatile disk ("DVD"), high definition DVD ("HD-DVD"), BLU-RAY, or other optical storage, magnetic cassettes, magnetic tape, magnetic disk storage, other magnetic storage devices, or any other medium that may be used to store the desired information in a non-transitory fashion.

A mass storage device, such as the mass storage device 1428 depicted in FIG. 14, may store an operating system utilized to control the operation of the computing device 1400. The operating system may comprise a version of the LINUX operating system. The operating system may comprise a version of the WINDOWS SERVER operating system from the MICROSOFT Corporation. According to further aspects, the operating system may comprise a version of the UNIX operating system. Various mobile phone operating systems, such as IOS and ANDROID, may also be utilized. It should be appreciated that other operating systems may also be utilized. The mass storage device 1428 may store other system or application programs and data utilized by the computing device 1400.

The mass storage device 1428 or other computer-readable storage media may also be encoded with computer-executable instructions, which, when loaded into the computing device 1400, transforms the computing device from a general-purpose computing system into a special-purpose computer capable of implementing the aspects described herein. These computer-executable instructions transform the computing device 1400 by specifying how the CPU(s) 1404 transition between states, as described above. The computing device 1400 may have access to computer-readable storage media storing computer-executable instructions, which, when executed by the computing device 1400, may perform the methods described herein.

A computing device, such as the computing device 1400 depicted in FIG. 14, may also include an input/output controller 1432 for receiving and processing input from a number of input devices, such as a keyboard, a mouse, a touchpad, a touch screen, an electronic stylus, or other type of input device. Similarly, an input/output controller 1432 may provide output to a display, such as a computer monitor, a flat-panel display, a digital projector, a printer, a plotter, or other type of output device. It will be appreciated that the computing device 1400 may not include all of the components shown in FIG. 14, may include other components that are not explicitly shown in FIG. 14, or may utilize an architecture completely different than that shown in FIG. 14.

As described herein, a computing device may be a physical computing device, such as the computing device 1400 of FIG. 14. A computing node may also include a virtual machine host process and one or more virtual machine instances. Computer-executable instructions may be executed by the physical hardware of a computing device indirectly through interpretation and/or execution of instructions stored and executed in the context of a virtual machine.

It is to be understood that the methods and systems are not limited to specific methods, specific components, or to particular implementations. It is also to be understood that the terminology used herein is for the purpose of describing particular embodiments only and is not intended to be limiting.

As used in the specification and the appended claims, the singular forms "a," "an," and "the" include plural referents unless the context clearly dictates otherwise. Ranges may be expressed herein as from "about" one particular value, and/or to "about" another particular value. When such a range is expressed, another embodiment includes from the one particular value and/or to the other particular value. Similarly, when values are expressed as approximations, by use of the antecedent "about," it will be understood that the particular value forms another embodiment. It will be further understood that the endpoints of each of the ranges are significant both in relation to the other endpoint, and independently of the other endpoint.

"Optional" or "optionally" means that the subsequently described event or circumstance may or may not occur, and that the description includes instances where said event or circumstance occurs and instances where it does not.

Throughout the description and claims of this specification, the word "comprise" and variations of the word, such as "comprising" and "comprises," means "including but not limited to," and is not intended to exclude, for example, other components, integers or steps. "Exemplary" means "an example of" and is not intended to convey an indication of a preferred or ideal embodiment. "Such as" is not used in a restrictive sense, but for explanatory purposes.

Components are described that may be used to perform the described methods and systems. When combinations, subsets, interactions, groups, etc., of these components are described, it is understood that while specific references to each of the various individual and collective combinations and permutations of these may not be explicitly described, each is specifically contemplated and described herein, for all methods and systems. This applies to all aspects of this application including, but not limited to, operations in described methods. Thus, if there are a variety of additional operations that may be performed it is understood that each of these additional operations may be performed with any specific embodiment or combination of embodiments of the described methods.

The present methods and systems may be understood more readily by reference to the following detailed description of preferred embodiments and the examples included therein and to the Figures and their descriptions.

As will be appreciated by one skilled in the art, the methods and systems may take the form of an entirely hardware embodiment, an entirely software embodiment, or an embodiment combining software and hardware aspects. Furthermore, the methods and systems may take the form of a computer program product on a computer-readable storage medium having computer-readable program instructions (e.g., computer software) embodied in the storage medium. More particularly, the present methods and systems may take the form of web-implemented computer software. Any suitable computer-readable storage medium may be utilized including hard disks, CD-ROMs, optical storage devices, or magnetic storage devices.

Embodiments of the methods and systems are described below with reference to block diagrams and flowchart illustrations of methods, systems, apparatuses, and computer program products. It will be understood that each block of the block diagrams and flowchart illustrations, and combinations of blocks in the block diagrams and flowchart illustrations, respectively, may be implemented by computer program instructions. These computer program instructions may be loaded on a general-purpose computer, special-purpose computer, or other programmable data processing apparatus to produce a machine, such that the instructions which execute on the computer or other programmable data processing apparatus create a means for implementing the functions specified in the flowchart block or blocks.

These computer program instructions may also be stored in a computer-readable memory that may direct a computer or other programmable data processing apparatus to function in a particular manner, such that the instructions stored in the computer-readable memory produce an article of manufacture including computer-readable instructions for implementing the function specified in the flowchart block or blocks. The computer program instructions may also be loaded onto a computer or other programmable data processing apparatus to cause a series of operational steps to be performed on the computer or other programmable apparatus to produce a computer-implemented process such that the instructions that execute on the computer or other programmable apparatus provide steps for implementing the functions specified in the flowchart block or blocks.

The various features and processes described above may be used independently of one another or may be combined in various ways. All possible combinations and sub-combinations are intended to fall within the scope of this disclosure. In addition, certain methods or process blocks may be omitted in some implementations. The methods and processes described herein are also not limited to any particular sequence, and the blocks or states relating thereto may be performed in other sequences that are appropriate. For example, described blocks or states may be performed in an order other than that specifically described, or multiple blocks or states may be combined in a single block or state. The example blocks or states may be performed in serial, in parallel, or in some other manner. Blocks or states may be added to or removed from the described example embodiments. The example systems and components described herein may be configured differently than described. For example, elements may be added to, removed from, or rearranged compared to the described example embodiments.

It will also be appreciated that various items are illustrated as being stored in memory or on storage while being used, and that these items or portions thereof may be transferred between memory and other storage devices for purposes of memory management and data integrity. Alternatively, in other embodiments, some or all of the software modules and/or systems may execute in memory on another device and communicate with the illustrated computing systems via inter-computer communication. Furthermore, in some embodiments, some or all of the systems and/or modules may be implemented or provided in other ways, such as at least partially in firmware and/or hardware, including, but not limited to, one or more application-specific integrated circuits ("ASICs"), standard integrated circuits, controllers (e.g., by executing appropriate instructions, and including microcontrollers and/or embedded controllers), field-programmable gate arrays ("FPGAs"), complex programmable logic devices ("CPLDs"), etc. Some or all of the modules, systems, and data structures may also be stored (e.g., as software instructions or structured data) on a computer-readable medium, such as a hard disk, a memory, a network, or a portable media article to be read by an appropriate device or via an appropriate connection. The systems, modules, and data structures may also be transmitted as generated data signals (e.g., as part of a carrier wave or other analog or digital propagated signal) on a variety of computer-readable transmission media, including wireless-based and wired/cable-based media, and may take a variety of forms (e.g., as part of a single or multiplexed analog signal, or as multiple discrete digital packets or frames). Such computer program products may also take other forms in other embodiments. Accordingly, the present invention may be practiced with other computer system configurations.

While the methods and systems have been described in connection with preferred embodiments and specific examples, it is not intended that the scope be limited to the particular embodiments set forth, as the embodiments herein are intended in all respects to be illustrative rather than restrictive.

Unless otherwise expressly stated, it is in no way intended that any method set forth herein be construed as requiring that its operations be performed in a specific order. Accordingly, where a method claim does not actually recite an order to be followed by its operations or it is not otherwise specifically stated in the claims or descriptions that the operations are to be limited to a specific order, it is no way intended that an order be inferred, in any respect. This holds for any possible non-express basis for interpretation, including: matters of logic with respect to arrangement of steps or operational flow; plain meaning derived from grammatical organization or punctuation; and the number or type of embodiments described in the specification.

It will be apparent to those skilled in the art that various modifications and variations may be made without departing from the scope or spirit of the present disclosure. Other embodiments will be apparent to those skilled in the art from consideration of the specification and practices described herein. It is intended that the specification and example figures be considered as exemplary only, with a true scope and spirit being indicated by the following claims.

What is claimed is:

1. A method of improving speech recognition, comprising:

configuring a machine learning model, wherein the machine learning model comprises a speech encoder configured to generate acoustic representations based on input speech, an adapter configured to generate adapted representations based on the acoustic representations from the speech encoder, and a decoder configured to generate text corresponding to the input speech;

applying a matching loss during training the machine learning model, wherein the matching loss is configured to explicitly force acoustic representations generated by the adapter to align with text embeddings, wherein the applying a matching loss further comprises:

applying cross attention between acoustic embedding and text embedding, and generating a sequence of acoustic representations that has a same length as a text embedding sequence; and fine-tuning the machine learning model by employing parameter-efficient low-rank adaptation (LoRA), wherein the machine learning model is trained to perform automatic speech recognition with performance improvement and parameter efficiency.

2. The method of claim 1, further comprising:

applying loss functions between the text embedding sequence and the generated sequence of acoustic representations.

3. The method of claim 1, further comprising:

fine-tuning the machine learning model using non-speech segments with empty transcripts to mitigate insertion errors.

4. The method of claim 1, further comprising:

performing data augmentation to introduce diverse acoustic conditions during training the machine learning model, wherein data augmentation comprises volume perturbation and speed perturbation.

5. The method of claim 1, further comprising:

refraining from adding random noise or music to training utterances.

6. The method of claim 1, further comprising:

implementing constraints during inference to mitigate insertion errors.

7. The method of claim 6, further comprising:

applying n-gram non-repetition constraint to ensure that n-gram tokens of a specified length do not repeat during decoding.

8. The method of claim 6, further comprising:

imposing a penalty on long decoding transcripts to reduce the insertion errors.

9. The method of claim 1, wherein the adapter comprises a depth-wise separable convolutional neural network (CNN) to enhance the parameter efficiency.

10. The method of claim 1, wherein the decoder comprises a large language model.

11. A system of improving speech recognition, comprising:

at least one processor; and at least one memory communicatively coupled to the at least one processor and comprising computer-readable instructions that upon execution by the at least one processor cause the at least one processor to perform operations comprising:

configuring a machine learning model, wherein the machine learning model comprises a speech encoder configured to generate acoustic representations based on input speech, an adapter configured to generate adapted representations based on the acoustic representations from the speech encoder, and a decoder configured to generate text corresponding to the input speech;

applying a matching loss during training the machine learning model, wherein the matching loss is configured to explicitly force acoustic representations generated by the adapter to align with text embeddings, wherein the applying a matching loss further comprises:

applying cross attention between acoustic embedding and text embedding, and generating a sequence of acoustic representations that has a same length as a text embedding sequence; and fine-tuning the machine learning model by employing parameter-efficient low-rank adaptation (LoRA), wherein the machine learning model is trained to perform automatic speech recognition with performance improvement and parameter efficiency.

12. The system of claim 11, the operations further comprising:

fine-tuning the machine learning model using non-speech segments with empty transcripts to mitigate insertion errors.

13. The system of claim 11, the operations further comprising:

performing data augmentation to introduce diverse acoustic conditions during training the machine learning model, wherein data augmentation comprises volume perturbation and speed perturbation.

14. The system of claim 11, wherein the operations comprise implementing constraints during inference to mitigate insertion errors, and wherein the implementing constraints during inference to mitigate insertion errors further comprise:

applying n-gram non-repetition constraint to ensure that n-gram tokens of a specified length do not repeat during decoding; and imposing a penalty on long decoding transcripts to reduce the insertion errors.

15. A non-transitory computer-readable storage medium, storing computer-readable instructions that upon execution by a processor cause the processor to implement operations comprising:

configuring a machine learning model, wherein the machine learning model comprises a speech encoder configured to generate acoustic representations based on input speech, an adapter configured to generate adapted representations based on the acoustic representations from the speech encoder, and a decoder configured to generate text corresponding to the input speech;

applying a matching loss during training the machine learning model, wherein the matching loss is configured to explicitly force acoustic representations generated by the adapter to align with text embeddings, wherein the applying a matching loss further comprises:

applying cross attention between acoustic embedding and text embedding, and generating a sequence of acoustic representations that has a same length as a text embedding sequence; and fine-tuning the machine learning model by employing parameter-efficient low-rank adaptation (LoRA), wherein the machine learning model is trained to perform automatic speech recognition with performance improvement and parameter efficiency.

16. The non-transitory computer-readable storage medium of claim 15, the operations further comprising:

performing data augmentation to introduce diverse acoustic conditions during training the machine learning model, wherein data augmentation comprises volume perturbation and speed perturbation; and fine-tuning the machine learning model using non-speech segments with empty transcripts to mitigate insertion errors.

17. The non-transitory computer-readable storage medium of claim 15, wherein the operations comprise implementing constraints during inference to mitigate insertion errors, and wherein the implementing constraints during inference to mitigate insertion errors further comprise:

applying n-gram non-repetition constraint to ensure that n-gram tokens of a specified length do not repeat during decoding; and imposing a penalty on long decoding transcripts to reduce the insertion errors.

* * * * *